(12) United States Patent
Schuler et al.

(10) Patent No.: US 6,284,082 B1
(45) Date of Patent: Sep. 4, 2001

(54) METHOD OF PRODUCING A WOUND INSULATING PIPE

(75) Inventors: Klaus Schuler; Dieter Lorenz, both of Berlin; Walter Gross, Herzogenaurach; Stefan Hain, Effeltrich; Hans-Henning Lessmann-Mieske, Neutraubling; Hans Schmuck, Regensburg; Karl Stenzel, Deuerling, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/242,759

(22) PCT Filed: Aug. 21, 1997

(86) PCT No.: PCT/DE97/01869

§ 371 Date: Nov. 18, 1999

§ 102(e) Date: Nov. 18, 1999

(87) PCT Pub. No.: WO98/08230

PCT Pub. Date: Feb. 26, 1998

(30) Foreign Application Priority Data

Aug. 21, 1996 (DE) .............................. 196 35 362

(51) Int. Cl.$^7$ .............................. G02B 6/44; H01B 19/00
(52) U.S. Cl. .......................... 156/190; 156/192; 156/194; 385/101; 385/104; 385/111
(58) Field of Search .................................. 156/184, 190, 156/191, 192, 194, 172, 173, 175, 154; 174/167, DIG. 33; 385/100, 101, 104, 111; 138/148, 115; 428/188

(56) References Cited

U.S. PATENT DOCUMENTS

| 3,485,940 | 12/1969 | Perry et al. . |
| 4,610,033 | 9/1986 | Fox, Jr. . |
| 5,594,827 | * 1/1997 | Joulie et al. .......................... 385/101 |
| 6,203,647 | * 3/2001 | Schuler et al. ....................... 156/171 |

FOREIGN PATENT DOCUMENTS

| 27 55 734 | 7/1978 | (DE) . |
| 29 01 872 | 7/1980 | (DE) . |
| 38 15 717 | 11/1989 | (DE) . |
| 0 146 845 | 7/1985 | (EP) . |
| 0 265 737 | 5/1988 | (EP) . |
| 0 720 181 | 7/1996 | (EP) . |
| 2 725 302 | 4/1996 | (FR) . |
| 58-107037 | 6/1983 | (JP) . |
| 94 06127 | 3/1994 | (WO) . |

OTHER PUBLICATIONS

MR Maschinenfabrik Reinhausen, "MR–Isolierrohre ROTAFIL® für die Hochspannungstechnik", 1991.

* cited by examiner

Primary Examiner—Michael W. Ball
Assistant Examiner—John T. Haran
(74) Attorney, Agent, or Firm—Kenyon & Kenyon

(57) ABSTRACT

A method of manufacturing a wound insulator pipe, in particular for a high voltage insulator, having one or more ducts for conductors of any kind is provided. A laminate structure is achieved by winding a material onto a spindle and impregnating with a resin. Initially first layers of the material to be wound are applied; then at least one groove is made in the surface obtained and then the winding is completed until the final diameter is attained.

3 Claims, 2 Drawing Sheets

METHOD OF PRODUCING A WOUND INSULATING PIPE

FIELD OF THE INVENTION

The present invention relates to a method of manufacturing a wound insulator pipe, in particular for a high voltage insulator, having at least one duct for conductors, optical fibers and the like to be subsequently drawn in.

BACKGROUND INFORMATION

Insulator pipes and high voltage insulators with integrated conductors, in particular optical fibers, are known in many variants. European Patent No. 0 265 737 describes such an arrangement where the optical fiber is guided in the form of a spiral along an optical fiber support. The optical fiber support in turn is designed as an insulating filament located in the cavity of the high voltage insulator.

Another arrangement is described in U.S. Pat. No. 3,485,940, where an optical fiber is surrounded by a polyester pipe, which is guided through the shank of the insulator in the longitudinal direction.

European Patent No. 0 146 845 describes another high voltage insulator where the optical fiber is also guided in a groove in an intermediate layer located between the shank and the shields in the longitudinal direction.

In the above-described high voltage insulators, the optical fiber is usually drawn into the prefabricated insulator or insulator pipe. German Patent No. 27 55 734 describes the use of longitudinal grooves for this purpose, which form ducts and accommodate conductors or optical fibers; these ducts are subsequently closed. Similarly, French Patent No. 2 725 302 describes a spiral groove provided in the wall of the insulator and an extruded continuous elastomeric tape placed in this groove. Then the conductor is placed on the top side of this tape and the optical fiber and the tape are pressed together by rolling, for example, so the tape is laid on the bottom of the groove and is pressed into the elastomeric material.

German Patent No. 29 01 872 describes an optical fiber in a longitudinal intermediate layer; the optical fiber is led out of the intermediate layer through bores.

A conventional method of manufacturing high voltage insulators is by winding insulator pipes made of epoxy resins with a fiberglass or synthetic fiber laminate structure. Such insulator pipes are described in the company brochure "MR-Isolierrohre ROTAFIL® für die Hochspannungstechnik (ROTAFIL® MR Insulator Pipes for High Voltage Technology)," form VK23-0/88de.

With such insulator pipes made of wound fiberglass plastic, it is not convenient to provide grooves on the outer periphery as described in French Patent No. 2 725 302, and then reclose them using elastomeric material. This would negatively affect the electric strength, in addition to not providing a homogeneous, mechanically strong outer insulating body surface.

SUMMARY OF THE INVENTION

An object of the present invention is to provide a suitable method for manufacturing a wound insulator pipe having at least one integrated duct for conductors or optical fibers to be subsequently drawn in, where the outer surface of the insulator pipe thus manufactured is smooth and without grooves, including subsequently closed grooves. Furthermore, the contour of the finished wound insulator pipe should not deviate from a circular shape.

One particular advantage of the method according to the present invention is that the surface of the finished wound insulator is completely smooth and homogeneous. This is important not only for high electric and dielectric strength, but also for mechanical strength; in addition, such a surface allows subsequent machining or treatment, such as grinding, painting, and the like without problems. Another advantage of the method according to the present invention is that no deviation from the circular shape occurs despite the hollow duct obtained during the procedure for subsequent insertion of optical fiber(s) or the like.

DETAILED DESCRIPTION

Figure 1A:
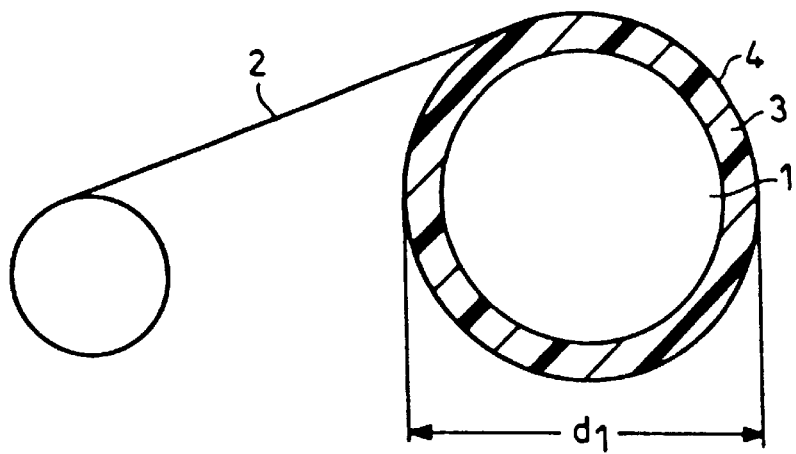
FIG. 1A illustrates a phase of a method according to the present invention.
Figure 1B:
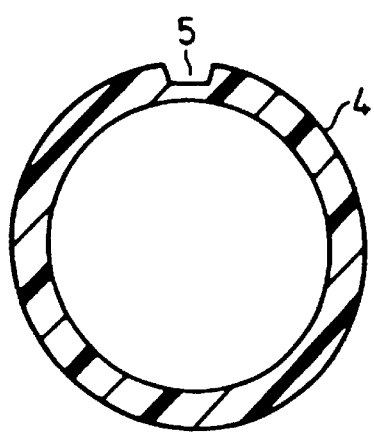
FIG. 1B illustrates another phase of the method according to the present invention.
Figure 1C:
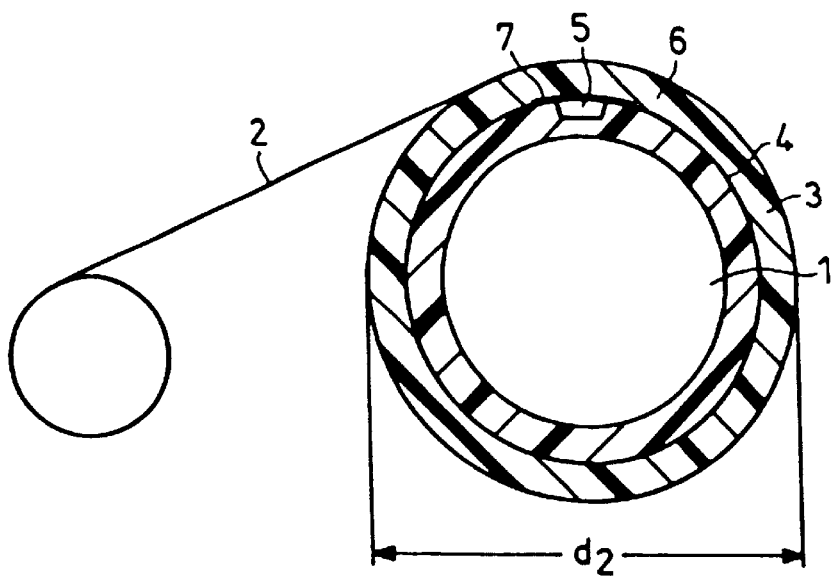
FIG. 1C illustrates yet another phase of the method according to the present invention.
Figure 2A:
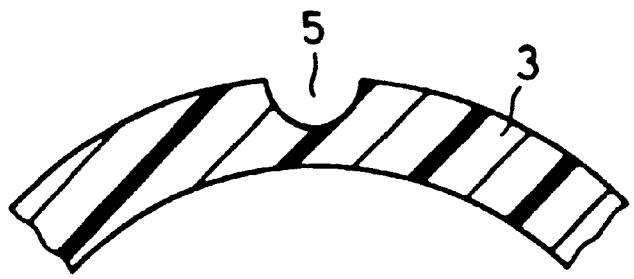
FIG. 2A illustrates a first grooved cross section produced from a method according to the present invention.
Figure 2B:
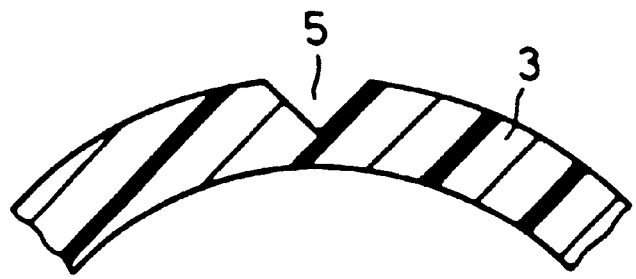
FIG. 2B illustrates a second grooved cross section produced from a method according to the present invention.
Figure 2C:
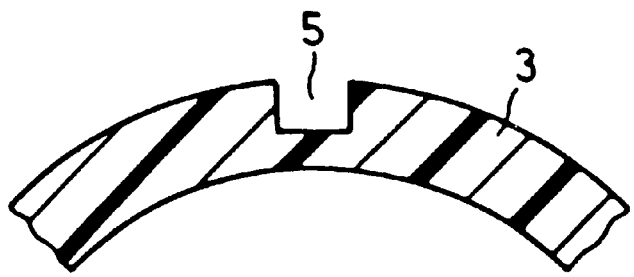
FIG. 2C illustrates a third grooved cross section produced from a method according to the present invention.

The steps of the method according to the present invention are the following:

A) First layers 3 of material 2 to be wound, for example, rovings, a tape or fibers, are wound onto a spindle 1 to a certain thickness $d_1$ and impregnated with resin. Then these first layers 3 are cured as much as possible in the conventional manner. Thus a laminated structure is obtained; it is particularly advantageous if epoxy resin is used as the resin and fiberglass or synthetic fibers such as polyester fibers are used as the material to be wound.

A mixed laminate structure is also an option, where, for example, the inner layer, directly wound on the spindle, is a polyester nonwoven, on which the material, for example, fiberglass, is wound.

B) One or more grooves 5 are cut or otherwise applied into surface 4 thus obtained. It is particularly advantageous to design the groove(s) 5 so that they extend longitudinally or as spirals peripherally in surface 4.

C) winding is continued, i.e., additional layers 6 of material 2 to be wound are applied until the final diameter $d_2$ of the insulator pipe is attained. In the case of a mixed laminate structure, different materials can be wound consecutively so that first layers 3 and subsequent layers 6 may contain materials that vary within one layer or between the different layers. For example, a cover layer of polyester fiber may be wound onto a fiberglass layer.

It can be particularly advantageous in many cases if groove(s) 5 are covered with a cover 7 immediately after being cut in order to avoid these grooves 5 becoming filled with resin during the subsequent additional winding. This cover 7 may be a wound protective layer surrounding the entire periphery, or such a cover 7 may also be provided only in the area of groove 5 by pressing a protective profile into groove 5, or a strip-like film or the like may be glued over groove 5.

Furthermore, it is advantageous in many cases if surface 4 is pretreated after groove 5 is made; this can be done mechanically by roughening or chemically by primer treatment to improve the adhesion of the additional layers 6 to be wound onto this surface 4. If a cover 7 is subsequently applied, it is, of course, particularly advantageous if its outer surface is also pretreated.

This pretreatment can be performed, for example, by grinding, which roughens the surface; it may affect the entire surface 4 or just certain areas thereof.

What is claimed is:

1. A method for manufacturing a wound insulator pipe for a high-voltage insulator, the wound insulator pipe having at least one channel for at least one of conductors and optical fibers to be subsequently drawn in, comprising the steps of:

winding onto a spindle first layers of a material until a first diameter is achieved, the material including one of rovings, tape, fiberglass, and synthetic material;

impregnating the first layers with resin to form an armor;

curing the armor so that a surface obtained can be mechanically machined;

machining at least one groove in the cured surface, the at least one groove extending one of longitudinally and in a spiral; and winding additional layers of the material onto the spindle until a final diameter of the insulator pipe is achieved, with the at least one groove therein forming a channel.

2. The method according to claim 1, further comprising the step of:

providing the at least one groove with a cover prior to the step of winding additional layers.

3. The method according to claim 2, further comprising the step of:

pretreating at least one of the surface and the cover at least one of mechanically and chemically prior to the step of winding additional layers.

* * * * *

UNITED STATES PATENT AND TRADEMARK OFFICE
CERTIFICATE OF CORRECTION

PATENT NO.    : 6,284,082 B1
DATED         : September 4, 2001
INVENTOR(S)   : Schuler et al.

It is certified that error appears in the above-identified patent and that said Letters Patent is hereby corrected as shown below:

<u>Title page,</u>
Item [73], please add the following Assignee:
-- Maschinenfabrik Reinhausen GmbH, Regensburg, Germany --.

Signed and Sealed this

Tenth Day of June, 2003

JAMES E. ROGAN
*Director of the United States Patent and Trademark Office*